United States Patent [19]
Motomura et al.

[11] Patent Number: 4,736,783
[45] Date of Patent: Apr. 12, 1988

[54] HEAVY LOAD PNEUMATIC RADIAL TIRE

[75] Inventors: Kenichi Motomura; Iwao Arimura, both of Tokyo, Japan

[73] Assignee: Bridgestone Corporation, Tokyo, Japan

[21] Appl. No.: 59,981

[22] Filed: Jun. 9, 1987

[30] Foreign Application Priority Data

Jun. 9, 1986 [JP] Japan .................................. 61-131758

[51] Int. Cl.$^4$ ............................................. B60C 11/03
[52] U.S. Cl. ............................. 152/209 A; 152/209 R
[58] Field of Search ........................ 152/209 R, 209 A

[56] References Cited

U.S. PATENT DOCUMENTS 3,405,753  10/1968  Verdier ........................... 152/209 A

FOREIGN PATENT DOCUMENTS 55-44028  3/1980  Japan .
1587855   3/1981  United Kingdom .

Primary Examiner—Michael Ball
Attorney, Agent, or Firm—Sughrue, Mion, Zinn, Macpeak & Seas

[57] ABSTRACT

A heavy load pneumatic radial tire having a tire tread sectioned into a plurality of circumferentially continuous ribs by a plurality of circumferentially extending wide main grooves. One of the ribs disposed at the outermost side when the tire is mounted on a vehicle is provided with a narrow groove circumferentially continuously formed in a proportion of 10% to 40% with respect to a width of the outermost rib from an adjacent tread end. The narrow groove separates the outermost rib into two portions. One of the ribs disposed at the innermost side when the tire is mounted on a vehicle is provided with a discontinuous narrow groove circumferentially disposed in a proportion of 10% to 50% with respect to a width of the innermost rib from an adjacent tread end. This discontinuous narrow groove is composed of circumferentially extending groove portions separated from each other by discontinuous portions each having a circumferential length not shorter than 20% but not longer than 50% of a circumferential length of each of the circumferentially extending groove portions.

18 Claims, 4 Drawing Sheets

HEAVY LOAD PNEUMATIC RADIAL TIRE

BACKGROUND OF THE INVENTION

1. Field of the Invention

This invention relates to a heavy load pneumatic radial tire used in trucks, busses, and the like. In particular, it relates to a tire having substantially circumferentially continuous ribs on opposite sides of the tire tread and being provided with a tread pattern formed so as to make the continuity of the respective ribs on the opposite sides asymmetric to thereby improve running performance at high-speed running on improved roads.

2. Prior Art

In general, the tires of the type for high-speed running on improved roads employs a tread sectioned into a plurality of circumferential ribs separated by a plurality of wide main grooves extending in the circumferential direction of the tire. The plurality of ribs, particularly ribs at opposite ends of the tread, are circumferentially continuous. However, tires mounted on floating wheels of vehicles, such s front wheels or trailer wheels, have a disadvantage that abrasion arises first on the ribs on the opposite ends at the early stage of abrasion as compared with ribs disposed at the central area of the tread this results in unbalanced abrasion.

Examples of the various types of unbalanced abrasion include edge-dropped abrasion in which the outside end portion at the opposite-side ribs is circumferentially nearly rectillinearly worn out, wavy abrasion in which the edge-dropped abrasion unevenly grows up on the circumference of the outside ribs to thereby make the outside ribs wavy on the circumference, shoulder-dropped abrasion in which the wavy abrasion further grows so that the wide area at each of the opposite-side portions of the tread is early worn out, and polygonal abrasion in which the wavy abrasion develops up to the ribs located on the central side over the main grooves so that the shoulder portion is shaped like a polygon on the circumference.

Various proposals have been proposed in order to prevent such unbalanced abrasion. Examples include a tire in which a large number of radially extending sipes are circumferentially disposed with respect to the ribs on the opposite sides of the tread. Also proposed is a tire in which the end portions on the opposite sides of the tread are cut into a round shape or a taper shape to form a truncated cone.

It is recognized that those conventional proposals have some beneficial effects, however, there is a problem in that, under the sever conditions where the ratio of the linear road portion is small while the ratio of the curved road portion is large, unbalanced abrasion is still apt to be generated. This wear is shoulder-dropped abrasion with wavy abrasion generated to a considerable extent so that the tire wears to drop its shoulder portion at the early stage of abrasion. Therefore the tread width in contact with the road surface is reduced, resulting in not only shortening tire lifetime against abrasion but degrading in stability of steering especially in the period of linear running.

The frequency of occurrence of such unbalanced abrasion is high especially in a half portion of the tire tread located at the outer side of a tire of a wheel when the wheel is mounted on a vehicle as its front wheel acting as a front idler or floating wheel. Although rotation of tires is sometimes carried out to cope with this problem, this work is troublesome and frequently ignored, and therefore tires are used mainly in the state where they are fixedly attached to an axle throughout tire life so that the problem of unbalanced abrasion becomes actualized.

As another example of a conventional tire is U.S. Pat. No. 3,411,559 (Re. 30,527) which discloses a tread pattern provided with two wide main grooves and several narrow subsidiary grooves for improving the attachment of tire to the road surface. However, it has been found that only the provision of those main grooves together with those subsidiary grooves cannot provide a sufficient effect to solve the problem of the foregoing various kinds of unbalanced abrasion.

As the result of various examinations, it has been confirmed that the tire which is proposed in Japanese Patent Application No. 2624780/1984 (corresponding to U.S. patent application Ser. No. 807,582, filed Dec. 11, 1985) uses circumferentially extending opposite-side ribs formed at opposite side ends of a tread of the tire and is sectioned into two portions by a narrow groove having such a width that the opposite walls of the narrow groove may come into contact with each other when the tire is loaded. This configuration is extremely effective to cope with the problem of unbalanced abrasion in the point that, of the two ribs divided by the narrow rib, shoulder dropped abrasion is generated only in the rib located on the outer side in the direction of the tire axis while no shoulder dropped abrasion is generated in the whole of the circumferentially extending rib located at the tread center portion. That is, the inventors of this application have appreciated such an advantage that the propagation of shoulder dropped abrasion to the tire-center-sided rib can be prevented by using the above-mentioned narrow groove.

However, it has also been found that there is a further problem in the reduction in lifetime against abrasion as well as in stability in rectilinear running, because at each of the opposite end sides of the tire, shoulder abrasion is generated in the tire-axially outer one of two ribs sectioned by the circumferentially extending narrow groove. The axial width of the tread contacting with the road surface becomes narrower.

As a result of further investigation, the inventors have found that the outside portion of the tread against a vehicle, when the tire mounted on the vehicle is especially mounted on the front wheel, is subjected to more severe input (distortion) from the road surface then the inside portion of the tread toward the vehicle. Thus, the inventors have attained the present invention.

SUMMARY OF THE INVENTION

An object of the present invention is to provide a tire in which the problem in various kinds of unbalanced abrasion existing in the conventional tire having a rib-type tread pattern can be eliminated to thereby make the abrasion of the tread more uniform and thereby totally improve the lifetime of the tread.

Another object of the present invention is to provide a tire in which the opposite-side ribs circumferentially extending at the opposite ends of the tire tread are provided with narrow grooves for proportionally separating the respective rib into two parts and in which the ribs disposed at the outermost and innermost sides when the tire is mounted on a vehicle, are asymmetrically arranged because of the different arrangement of the narrow grooves. This eliminates the problem in unbalanced abrasion as well as lifetime against abrasion.

In order to attain the above objects, according to one aspect of the present invention, a heavy load pneumatic radial tire tread is sectioned into a plurality of circumferentially continuous ribs by a plurality of substantially circumferentially extending wide main grooves, in which one of the ribs disposed at the outermost side when the tire is mounted on a vehicle is provided with a narrow groove circumferentially continuously formed in a proportion of 10% to 40% with respect to a width of the outermost rib from an adjacent tread end to thereby separate the outermost rib into two parts, and another one of the ribs disposed at the innermost side when the tire is mounted on a vehicle is provided with another narrow groove circumferentially discontinuously disposed in a proportion of 10% to 50% with respect to a width of the innermost rib from an adjacent tread end so that the outer narrow groove is composed of circumferentially extending groove portions and circumferentially extending discontinuous portions each having a circumferential length not shorter than 20% but not longer than 50% of a circumferential length of each of the circumferentially extending groove portions.

The term "narrow groove" herein used is defined as a groove having such a small width that the opposite walls defining the groove come in contact with each other when the loaded tire is driven to rotate. Although the circumferential continuity in the opposite-side ribs is important, however the continuity is not obstructed by the provision of narrow sipings. With respect to the ribs circumferentially extending on the central side of the tread, the circumferential continuity thereof is not obstructed by the provision of the large number of narrow sipes. Sometimes, the provision of the sipes may be desirable for satisfying specific required performance of the tire in accordance with the conditions of use. The term "tread end" herein used is defined as a contact end part of the tread which comes in contact with the road surface when the tire is normally loaded. Particularly, in the case where the tread end is shaped as a round shoulder, at the location where the contact end part of the tread comes in contact with the road surface is based on standard tire design.

These and other objects, features and advantages of the present invention will become apparent upon a reading of the following detailed description and drawings, in which

DETAILED DESCRIPTION OF THE PREFERRED EMBODIMENTS

Figure 1:
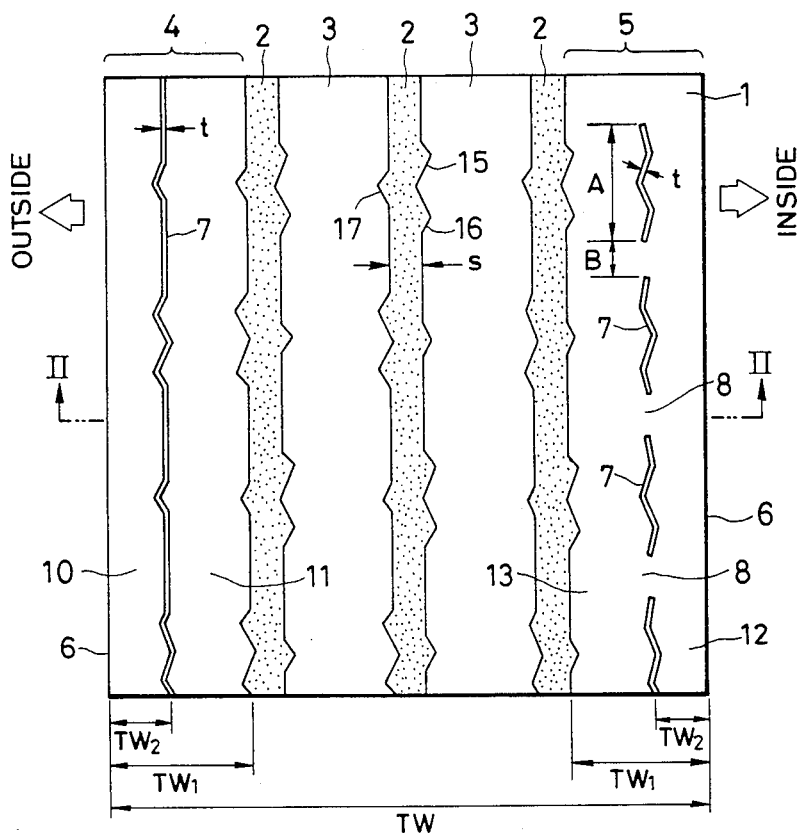
FIG. 1 is a plan view showing an embodiment of the heavy load pneumatic radial tire tread according to the present invention.
Figure 2:
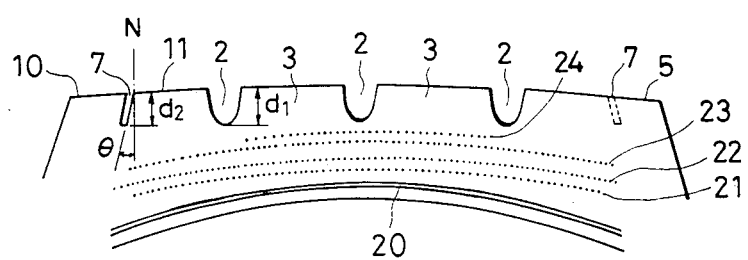
FIG. 2 is a sectional view taken along the line II—II of FIG. 1.

FIG. 1 is a plan view showing an embodiment of the heavy load pneumatic radial tire tread according to the present invention. FIG. 2 is a sectional view taken along the line II—II of FIG. 1. The tire size may be 11R24.5. The tread zone 1 is sectioned into four circumferentially continuous ribs by three circumferentially wide main grooves 1. The ribs are composed of two ribs 3 disposed in the central zone of the tread 1, and two ribs 4 and 5 disposed on opposite sides of the tread. Reference numeral 4 designates an outermost rib located on the outermost side, and the reference numeral 5 designates an innermost rib located on the inner side, when the tire is mounted on a car. FIG. 1 designates the tire "outside" and "inside". The outermost rib 4 is further sectioned into an outer rib 10 and an inner rib 11 by a circumferentially extending narrow groove 7. The outer and inner ribs 10 and 11 are located at the outer and inner positions with respect to the axis of the tire. Similarly, the innermost rib 5 is further sectioned into an outer rib 12 and an inner rib 13 by a circumferentially extending narrow groove 7. In the innermost rib 5, the narrow groove 7 is discontinuously circumferentially extended to form discontinuous parts 8 joining ribs 12 and 13.

As illustrated in FIG. 2 a plurality of belt layers 21, 22, 23 and 24, each have a substantially radially extending cord and are disposed between a carcass layer 20 and the tread to thereby reinforce the tread. The cords of the belt layers 22 and 23, are disposed to intersect each other at an angle of substantially 17 degrees with respect to the circumferential direction to thereby form a main belt layer. The cord of the first belt layer 21 is disposed in the same direction as the cord of the second belt layer 22 and at an angle of substantially 67 degrees with respect to the circumferential direction. The cord of the fourth belt layer 24, which is narrow, is disposed in the same direction as the cord of the third belt layer 23 and at an angle of substantially 17 degrees with respect to the circumferential direction.

The tread width TW is selected to be 210 mm for a 11R 24.5 size tire. The respective main groove 2 has a groove width S of 12 mm sufficiently wide taking into consideration drain properties in wet conditions. The main groove 2 extends substantially parallel to the circumferential direction and partially has notches 15, 16 and 17 to thereby attain improved wet performance. Compared with the zigzag main groove conventionally used in the tires of this type, the main groove 2 is linear and is characterized by the following points. At the junction portion between the notches 15 and 16 triangularly formed by enlarging the main groove from the inner side of the vehicle, the notch 17 triangularly formed by enlarging the main groove from the outer side of the vehicle is provided at the opposite side. This enlarges the circumferential width of the groove. Along the main groove 2, preceding and following such a structure, i.e. the notches 15, 16 and 17, a notch structure reversed with respect to the left and right is arranged. In short, the notches are provided in alternate orientations to form quasi zigzags.

The respective narrow grooves 7 have a groove width t of about 1.0 mm in this embodiment. The groove width t of the narrow groove is selected to fall within a range of 0.3% to 3% of the tread width TW, so that the opposite walls of the narrow groove come in contact with each other in the area of the tread which comes in contact with the road surface when the tire is rotated in the loaded condition. The circumferentially extending narrow groove 7 of the outermost rib 4 is formed along the edge of the adjacent main groove 2, partially in zigzag and partially linearly. On the other hand, the circumferentially extending narrow groove 7 of the innermost rib 5 is formed entirely in zigzag along the edge of the adjacent main groove 2. This is because the provision of the narrow groove portions corresponding to the notch portions of the main groove and the provision of the discontinuous portions 8 corresponding to the linear portions of the main groove advantageously attain the objects of the present invention or improving the wet performance.

The axial width $TW_1$ in each of the innermost and outermost ribs 4 and 5 is selected to be 45 mm. The distance $TW_2$ between the surface center of the narrow groove 7 in each of the innermost and outermost ribs 4 and 5 and the adjacent tread end is selected to be about 15 mm. In this embodiment, the ratio widths $TW_1$ and $TW_2$ $TW_2/TW_1$ is about 0.33. In the heavy load pneumatic radial tires of this type, it is most preferable that the respective narrow grooves be disposed with separation of 30% of the rib width, and inclusively 33% of the rib width when viewed from the adjacent tread end.

The outermost rib 4 is sectioned into an outer rib 10 and an inner rib 11, and the innermost rib 5 is sectioned into an inner rib 12 and an outer rib 13 at the above-mentioned ratio. Furthermore, circumferential discontinuity is provided to the narrow groove in the innermost rib 5. In this embodiment, the circumferential length A of the respective divisional portion of the narrow groove 7 is selected to be 30 mm, and the circumferential length B of the respective discontinuous portion 8 is selected to be 10 mm. Accordingly, discontinuity B/A (%) is about 33%.

The respective narrow grooves 7 may be formed perpendicular to the surface of the tread in each of the innermost and outermost ribs. Alternatively, the respective narrow groove 7 may be formed by cutting the rib portion with axially outwards inclination at a small angle $\theta$ with respect to the normal line N perpendicular to the tread surface at the opening edge of the groove. Preferably, the narrow groove may be formed by cutting the rib portion with inclination at an angle $\theta$ of 20 degrees or less with respect to the normal line N, so that the bottom of the groove is one-sided outwards. This embodiment defines the case where the depth $d_2$ of the narrow groove 7 equals the depth $d_1$ of the main groove. The depth $d_2$ of the narrow groove can be selected to have a value within a range from 30% to 100% of the depth $d_1$ of the main groove. The preferred depth of $d_1$ is 14.0 mm.

Figure 3:
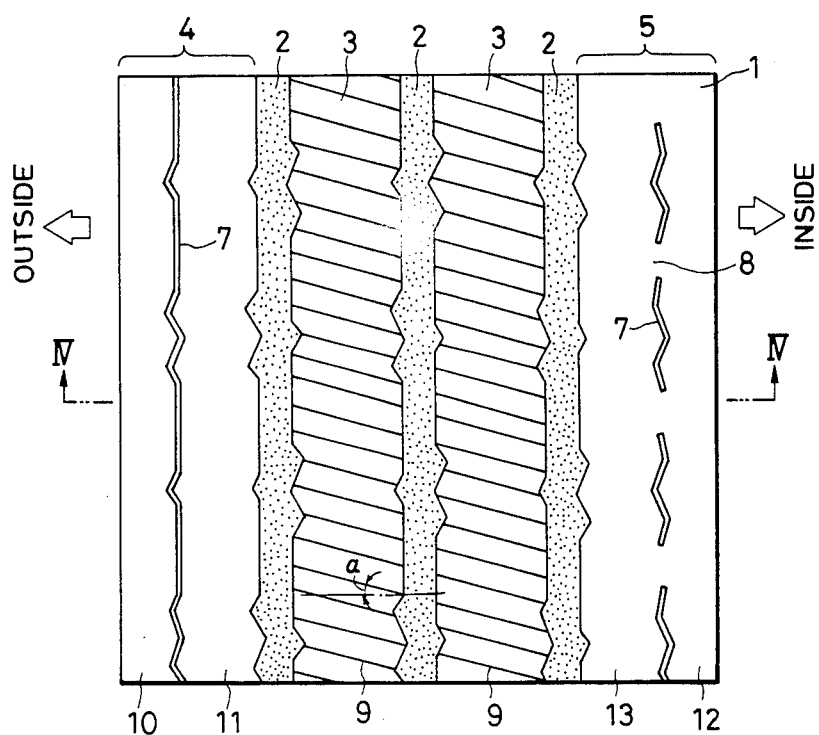
FIG. 3 is a plan view showing another embodiment of the tread according to the invention.
Figure 4:
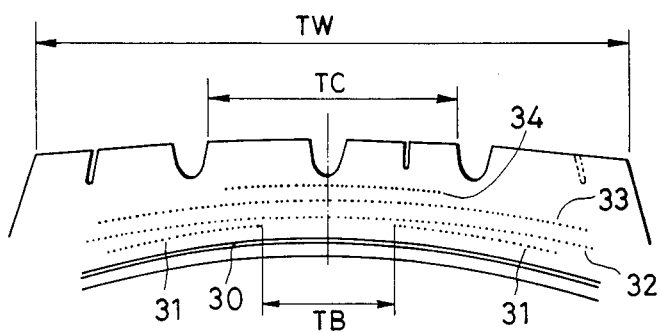
FIG. 4 is a sectional view taken along the line IV—IV of FIG. 3.

FIG. 3 is a plan view showing modification (11R24.5) of the heavy load pneumatic radial tire tread according to the present invention, and FIG. 4 is a sectional view taken along the line III—III of FIG. 3. A large number of axially independently extending sipes 9 are formed in the two ribs 3 which are sectioned by the central main groove 2 in the tread. The ribs are defined at their outer boundary by the two axially outer main grooves 2. The sipes 9 are not provided in the innermost and outermost ribs 4 and 5. Preferably, the respective sipes 9 have a width less than the width of the narrow groove 7.

A plurality of belt layers 31, 32, 33 and 34 each having a substantially radially extending cord are disposed between a carcass layer 30 and the tread to reinforce the tread. The belt layers 32 and 33, form a main belt layer in the same manner as the belt layers 22 and 23 in the embodiment of FIGS. 1 and 2.

The first belt layer 31 is formed in the same manner as the first belt layer 21 in the embodiment of FIGS. 1 and 2, except that the layer 31 of this embodiment is separated into two parts at a distance TB almost symmetrically with respect to the tread center C. The cord of the fourth narrow belt layer 34 is disposed in the direction intersecting the direction of the cord of the third belt layer and at an angle of 17 degrees with respect to the circumferential direction in order to suppress the increase of the circumferential length of the tread center portion owing to the separation of the first belt at the central portion.

The tread central ribs 3 are disposed over a width TC symmetrically with respect to the main groove 2 placed at the central portion of the tread. The ratio TB/TC of the separation distance TB between the divisional parts of the first belt layer 31 to the center rib width TC is important for increasing durability and lifetime against abrasion. Preferably, the rate TB/TC is selected to fall within a range of from 0.40 to 0.65. In this embodiment TB/TC is selected to be 0.53.

By the separation of the first belt layer 21, the specific stiffness in each of the innermost and outermost ribs 4 and 5 becomes larger than the stiffness in each of the center ribs 3 to thereby reduce the difference in the quantity of abrasion between the two types of ribs. Accordingly, the stiffness of the center rib 3 decreases to thereby delay the occurrence of unbalanced abrasion or shoulder dropped abrasion at the innermost and outermost ribs. This occurs because of the dragging of the innermost and outermost ribs caused by the difference in outside diameter between the center rib 3 and the innermost and outermost ribs 4, 5. Furthermore, the same effect can be attained by the provision of sipes.

The respective sipes are within a range of angle ($\alpha$) of from 0 to $\pm 60$ degrees. As a result of investigating the mechanism in occurrence of so-called heal-and-toe abrasion which generates a difference in level between the front and back of the sipe, it was found that the range of 0 to 40 degrees is effective for the tire mounted on a low-input (distortion) drive shaft and that the range of 40 to 60 degrees is effective for the tire mounted on a high-input (distortion) floating wheel. This prevents heal-and-toe abrasion. Even in the case where the sipes formed in the tread-center-sided ribs of the tire mounted on the floating wheel is within a range of angle of 0° to 40°, the occurrence of heal-and-toe abrasion can be prevented by establishing the depth of the sipes to be larger at the central side and less at the tread end side.

Figure 5:
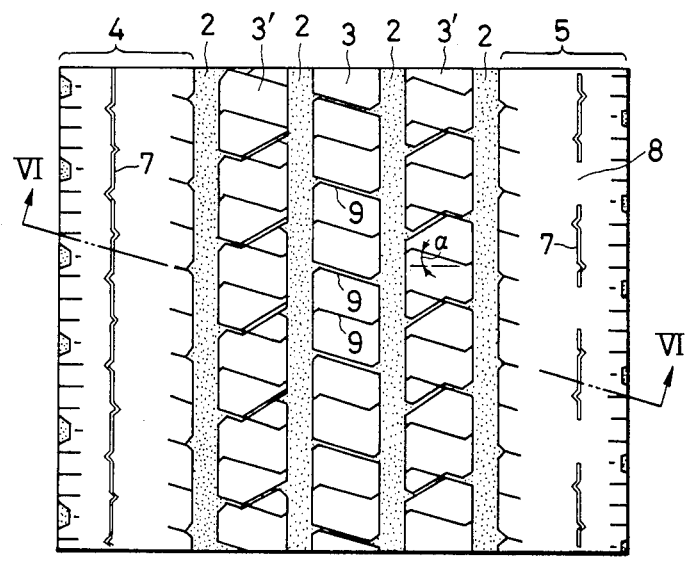
FIG. 5 is a plan view showing a modification of tread of the invention.
Figure 6:
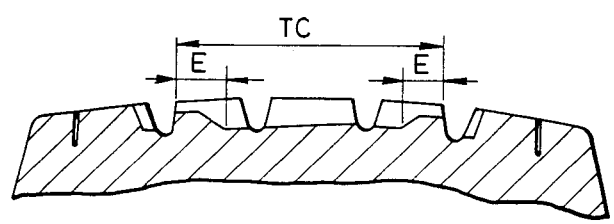
FIG. 6 is a sectional view taken along the line VI—VI of FIG. 5.

FIG. 5 is a plan view showing another modification of the invention, in which the tread 1 is separated into three ribs disposed at the central portion of the tread 1 and two ribs 4 and 5 disposed on the opposite end sides of the tread by four wide circumferential main grooves 2. Narrow grooves 7 are arranged in the same manner as described above. The three ribs disposed at the central portion are sectioned into a large number of blocks by a large number of sipes 9 with an inclination angle $\alpha$ of 20 degrees. As shown in FIG. 6, a sectional view taken along the line VI—VI of FIG. 5, the depth of the respective spies 9 is made deep at the center rib 3 disposed at the center portion, and similarly deep at the center-sided part of each of the ribs 3' disposed at the opposite sides thereof. But, the sipes are shallow at the axially outer portions of the ribs 3', that is adjacent the ribs 4 and 5 disposed on the opposite sides of the tread. The total length 2E of the symmetrical shallow part should be not less than 10% of the axial width TC of the central rib portion but should be less than 50%, i.e. 10%<2E<50%. Heal-and-toe abrasion can be improved owing to the stiffness distribution of the ribs with a ratio as described above.

Figure 7:
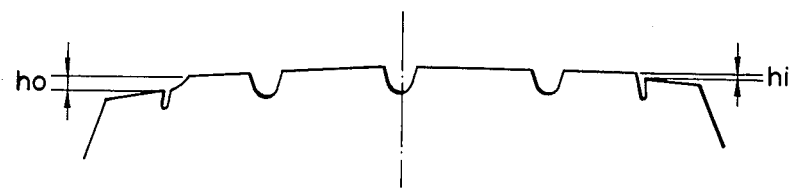
FIGS. 7 and 8 are sectional views showing the conditions of abrasion in comparison between the tire according to the invention and a comparative tire.
Figure 8:
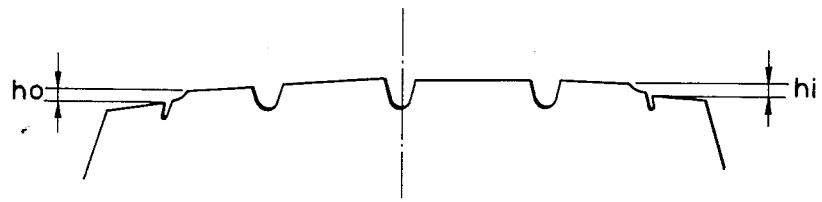

FIG. 7 is a sectional view of the tread portion showing the middle stage of abrasion (tread wear rate: 50%) in the tire of FIGS. 1 and 2 according to the present invention. FIG. 8 is a sectional view of the tread portion showing the middle stage of abrasion (tread wear rate: 50%) in a comparative tire which is constructed in the manner as in FIGS. 1 and 2 except that the narrow groove of the innermost rib of FIG. 8 is formed substantially equally to the narrow groove of the outermost rib according to the present invention, that is except that the narrow groove of the innermost rib of FIG. 8 is circumferentially continuous.

Unbalanced abrasion is estimated by the difference $h_i$ in quantity of abrasion between the outer rib and the inner rib in the innermost rib. The large difference $h_0$ in quantity of abrasion between the outer rib and the inner rib in the outermost rib is permitted as long as the influence of unbalanced abrasion can be prevented. The object of the present invention is to control the difference $h_i$ into a small value.

It is apparent from these drawings that the difference in quantity of abrasion in the innermost rib of the tire according to the present invention is relatively less compared with the comparative tire. Table 1 shows the resultant appearance and performance of the tire when a vehicle employing the tire of FIGS. 1 and 2 or employing the comparative tire was driven on a good road. The numeral values in Table 1 designate index numbers in which the comparative tire is expressed as 100. Accordingly, as the numeral value increases, the result improves. Shoulder dropped abrasion is measured by the difference $h_i$ in the quantity of abrasion of the outer rib in the innermost rib after the vehicle has run 100,000 km. The stability in rectilinear running is shown as a result of feeling test of the driver.

TABLE 1

|  | Comparative tire | Embodiment 1 |
|---|---|---|
| Shoulder dropped abrasion ($h_1$) | 100 | 250 |
| Lifetime against abrasion | 100 | 110 |
| Stability in rectilinear running | A little unstable. | No problem. |
| Appearance | The tread width is reduced. | The tread width is little reduced. |

Table 2 shows the result of test as to another embodiment (Embodiment 2) using the tread pattern of FIG. 1 and using the belt layer structure having the separated belt layer of FIG. 4. Compared with Embodiment 1 of Table 1, Embodiment 2 of Table 2 is improved by 80% in shoulder dropped abrasion and improved by 30% in lifetime against abrasion. The numeral values in Table 2 designated index numbers in which the tire of Embodiment 1 is expressed as 100. The stability in rectilinear running and appearance are equal to those of Embodiment 1.

TABLE 2

|  | Embodiment 1 | Embodiment 2 |
|---|---|---|
| Shoulder dropped abrasion ($h_i$) | 100 | 180 |
| Lifetime against abrasion | 100 | 130 |

With respect to the tire according to the present invention, the quantity of shoulder dropped abrasion in the outer rib of the innermost rib is reduced to keep the contact width of the tread wide. On the other hand, the function of preventing the influence of unbalanced abrasion owing to the narrow grooves is effective in the outermost rib being severe in the condition of input (distortion) to thereby secure the contact width of the tread. Accordingly, the lifetime of the tread against abrasion can be improved.

As described above, according to the present invention, various problems in unbalanced abrasion which can be observed at the shoulder portion of the tread of the conventional heavy load pneumatic radial tire having a rib-type tread pattern can be simultaneously solved to thereby make the abrasion of the tread more uniform. Accordingly, the lifetime of the tread against abrasion can be significantly improved.

What is claimed is:

1. A heavy load pneumatic radial tire comprising; a tire tread sectioned into a plurality of circumferentially continuous ribs by a plurality of circumferentially extending wide main grooves, one of the ribs disposed at the outermost side when said tire is mounted on a vehicle and provided with a narrow groove circumferentially continuously formed in a proportion of 10% to 40% with respect to a width of the outermost rib from an adjacent tread end, said narrow groove separating the outermost rib into two portions, and one of the ribs disposed at the innermost side when the tire is mounted on a vehicle and provided with a discontinuous narrow groove circumferentially disposed in a proportion of 10% to 50% with respect to a width of the innermost rib from an adjacent tread end, said discontinuous narrow groove composed of circumferentially extending groove portions separated from each other by discontinuous portions each having a circumferential length not shorter than 20% but not longer than 150% of a circumferential length of each of said circumferentially extending groove portions.

2. The tire of claim 1 wherein said wide main grooves have notch groupings on the walls of said groove, each notch group comprising a pair of notches in one wall and a opposed notch in an opposite wall centered with respect to said pair of notches.

3. The tire of claim 2 wherein said notch groupings alternate patterns circumferentially in the main groove walls.

4. The tire of claim 1 wherein said continuous narrow groove has a groove width of 0.3% to 3.0% of the width of said tread.

5. The tire of claim 1 wherein said continuous narrow groove comprises alternate zig-zag and straight portions.

6. The tire of claim 1 wherein said discontinuous narrow groove has a zig-zag pattern.

7. The tire of claim 1 wherein said tire further comprises four belt layers positioned under said tread layer, said belt layers comprising two pairs of belts having cords aligned in each pair and the cords of the two pairs crossing with each other.

8. The tire of claim 1 wherein the depth of said narrow continuous groove is 30% to 100% of the depth of said wide grooves.

9. The tire of claim 1 wherein said tire has three wide circumferential grooves and two circumferential ribs in a central zone of said tire.

10. The tire of claim 1 wherein each of said circumferential ribs has a series of sipes extending across said ribs from one wide circumferential groove to another wide circumferential groove.

11. The tire of claim 10 wherein said sipes in each rib are parallel to each other.

12. The tire of claim 10 wherein said sipes are inclined with respect to the axial direction of said tire at an angle in the range of 0° to 60°.

13. The tire of claim 10 wherein said tire further comprises a plurality belt layers under said tread, said belt layers comprising an innermost layer separated into two parts and an outermost layer overlapping the separation between the two parts of said innermost layer.

14. The tire of claim 13 wherein said tire comprises four belt layers, wherein cords of a belt layer adjacent to said innermost layer crosses cords of said innermost layer.

15. The tire of claim 10 wherein said sipes divide said ribs into a number of blocks.

16. The tire of claim 15 wherein said tire has four wide circumferential grooves and three circumferential ribs in a central zone.

17. The tire of claim 16 wherein sipes disposed in a center rib have a constant depth and sipes in ribs adjacent to said center rib have sipes which have a portion with a depth substantially the same as the depth of said sipes in said center rib and outer portions of a shallower depth.

18. The tire of claim 15 wherein said blocks each have a plurality of narrow sipes extending from one side of a block to an opposite side.

* * * * *